United States Patent Office 3,763,163
Patented Oct. 2, 1973

3,763,163
4-(N,O-DISUBSTITUTED-HYDROXYLAMINO)- QUINAZOLINES
Goetz E. Hardtmann, Florham Park, N.J., assignor to Sandoz-Wander, Inc., Hanover, N.J.
No Drawing. Continuation-in-part of abandoned applications Ser. No. 37,328 and Ser. No. 37,329, both May 14, 1970. This application Nov. 22, 1971, Ser. No. 201,182
Int. Cl. C07d 51/48
U.S. Cl. 260—256.4 Q    12 Claims

ABSTRACT OF THE DISCLOSURE

The invention discloses compounds of the class of 4-(N,O - disubstituted-hydroxylamino)-quinazolines, e.g. 4-(N,O - dimethylhydroxylamino)-6,7-dimethoxy-quinazoline maleate. Such compounds are useful as pharmaceutical agents, e.g. bronchodilators. The compounds may be prepared by reacting a 4-haloquinazoline with the appropriate corresponding N,O-disubstituted-hydroxylamine.

---

This application is a continuation-in-part of my copending applications Ser. Nos. 37,328 and 37,329, both filed May 14, 1970, and now both abandoned.

The present invention relates to quinazoline derivatives, and more particularly to compounds which are 4-(N,O-disubstituted-hydroxylamino)-quinazolines. The invention also relates to pharmaceutical compositions and methods utilizing the pharmacological activities of said compounds.

The compounds of the present invention are represented by the following structural Formula I:

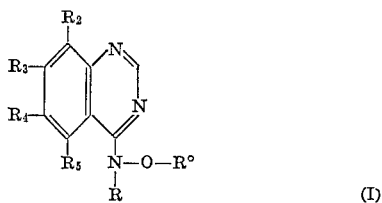

(I)

wherein
R° is lower alkyl of 1 to 6 carbon atoms or

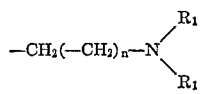

$n$ is 0 to 4,
each of $R_1$ is lower alkyl of 1 to 3 carbon atoms,
R is lower alkyl of 1 to 4 carbon atoms,
each of $R_2$, $R_3$, $R_4$ and $R_5$ is hydrogen, halo of atomic weight of from 18 to 36, lower alkyl of 1 to 3 carbon atoms or lower alkoxy of 1 to 3 carbon atoms; provided that $R_5$ is other than hydrogen only when all of $R_2$, $R_3$ and $R_4$ are hydrogen, that no more than one of $R_2$, $R_3$ and $R_4$ is halo; that no more than two of $R_2$, $R_3$ and $R_4$ are lower alkyl, and that any of $R_2$, $R_3$ and $R_4$ which are other than hydrogen are the same, or
$R_3$ and $R_4$ together form methylenedioxy, or a pharmaceutically acceptable acid addition salt thereof.

The compounds of Formula I are preferably prepared by reacting a 4-haloquinazoline of the Formula II:

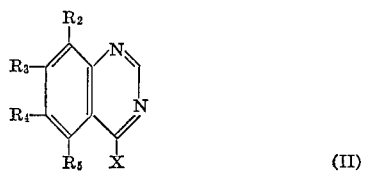

(II)

wherein $R_2$, $R_3$, $R_4$ and $R_5$ are as defined and X is chloro or bromo, with an appropriately substituted hydroxylamine of the Formula III:
wherein R° and R are as defined.

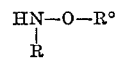

(III)

The preparation of compounds I by reaction of a compound II with a compound III may be suitably carried out in a known manner at temperatures in the range of 30° C. to 150° C., preferably 50° C. to 100° C. The reaction is carried out in a liquid medium preferably provided by an inert organic solvent which may be any of several of the well-known conventional solvents, preferably an aromatic solvent such as benzene. Alternately, the reaction may be carried out in the liquid medium provided by employing an excess of compound III. An acid binding agent such as sodium or potassium carbonate may be also employed to advantage in the reaction, if desired. The reaction product of Formula I may be isolated from the reaction mixture by working up by established procedures.

The compounds of Formula III are either known or may be prepared from known materials by established procedures. The compounds of Formula II are either known per se or may be prepared from known materials by established procedures or by the procedures disclosed and illustrated hereinafter in the examples hereof.

Also within the scope of the novel compounds of the invention are pharmaceutically acceptable non-toxic salts not materially affecting the pharmacological properties of the compounds of Formula I. Such salts include the acid addition salts, e.g., the hydrochloride, methanesulfonate, fumarate and maleate. Such salts may be readily converted to the free bases by conventional procedures. Conversely, the free bases may be readily converted into the acid addition salts by established procedures.

The compounds of Formula I and their pharmaceutically acceptable acid addition salts are useful because they possess pharmacological activity in animals. In particular, the compounds of Formula I are useful as bronchodilator agents as indicated by observing the respiratory status on oral administration to the unanesthetized guinea pig exposed to aerosolized histamine dihydrochloride according to a modification of the method of Van Arman et al., J. Pharmacol. Exptl. Therap., 133:90–97, 1961; and in vitro by observing the effect on strips of guinea pig trachea according to the method of Constantine, J. Pharm. Pharmacol., 17:384–385, 1960.

For the above use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned use, the dosage administered will, of course, vary depending upon the compounds used, the therapy desired and the mode of administration. However, in general, satisfactory results are obtained when administered at a daily dosage of from about 3 milligrams to about 100 milligrams per kilogram of body weight, preferably given in divided doses 2 to 4 times a day, or in sustained release form. For the larger mammals the administration of from about 200 milligrams to about 3000 milligrams of the compound per day provides satisfactory results and dosage forms suitable for internal administration comprise from about 50 milligrams to about 1500 milligrams of the compound in admixture with a solid or liquid pharmaceutical carrier or diluent.

The compounds of the Formula I having the Formula Ia:

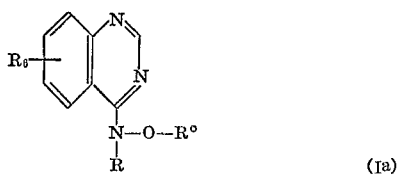

wherein R and R° are as above defined and $R_6$ is hydrogen, halo (fluoro or chloro), lower alkyl of 1 to 3 carbon atoms or lower alkoxy of 1 to 3 carbon atoms, and their pharmaceutically acceptable acid addition salts, are also useful as diuretic agents as indicated by a determination of sodium and potassium using the Baird-Atomic flame photometer and the unanesthetized rat according to the method of Roy Aston, Toxicol. and Applied Pharmacology, 1:277, 1959 (oral administration).

In diuretic use, the compounds of the Formula Ia may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For diuretic use, the dosage administered will, of course, vary depending upon the compound used, the therapy desired and the mode of administration. However, in general, satisfactory results are obtained when administered at a daily dosage of from about 2 milligrams to about 200 milligrams per kilogram of body weight, preferably given in divided doses 2 to 4 times a day, or in sustained release form. For larger mammals the administration of from about 120 milligrams to about 2000 milligrams of the compound per day provides satisfactory results and dosage forms suitable for internal administration comprise from about 30 milligrams to about 1000 milligrams of the compound in admixture with a solid or liquid pharmaceutical carrier or diluent.

In addition, the compounds of the Formula I in which R° is lower alkyl are also useful as anti-inflammatory agents as indicated by the carrageenan-induced edema test on rats (oral administration). For use as anti-inflammatory agents satisfactory results are generally obtained when administered at a daily dosage of from about 1.5 to 175 milligrams per kilogram of body weight, preferably given in divided dosages 2 to 4 times a day, or in sustained release form. For larger mammals the administration of from about 100 to about 2000 milligrams per day provides satisfactory results and dosage forms suitable for internal administration comprise from about 25 milligrams to about 1000 milligrams of the compound in admixture with a conventional solid or liquid pharmaceutical carrier or diluent. For anti-inflammatory use administration may be orally or parenterally, preferably orally.

For all the above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g. starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation for oral administration four times a day for the prophylactic treatment of bronchial asthma is a tablet prepared by conventional tabletting techniques and containing the following ingredients.

| Ingredient: | Weight (mg.) |
|---|---|
| 4 - (N,O - dimethylhydroxylamino) - 6,7 - dimethoxy-quinazoline maleate methanesulfonate | 75 |
| Tragacanth | 10 |
| Lactose | 127.5 |
| Corn starch | 25 |
| Talcum | 15 |
| Magnesium stearate | 2.5 |

A representative formulation for oral administration four times a day to effect diuresis is a tablet prepared by conventional tabletting techniques and containing the following ingredients.

| Ingredient: | Weight (mg.) |
|---|---|
| 4 - (N,O - dimethylhydroxylamino)-quinazoline | 50 |
| Tragacanth | 10 |
| Lactose | 172.5 |
| Corn starch | 25 |
| Talcum | 15 |
| Magnesium stearate | 2.5 |

A representative formulation for oral administration four times a day for treatment of inflammation is a capsule prepared by conventional techniques and containing the following ingredients.

| Ingredient: | Weight (mg.) |
|---|---|
| 4 - (N,O - dimethylhydroxylamino) - 6,7-methylenedioxy-quinazoline | 50 |
| Lactose | 250 |

The following examples show representative compounds encompassed within the scope of this invention and the manner in which such compounds are prepared. However, it is to be understood that the examples are for purposes of illustration only.

EXAMPLE 1

4-(N,O-dimethylhydroxylamino)-6,7-dimethoxy-quinazoline maleate

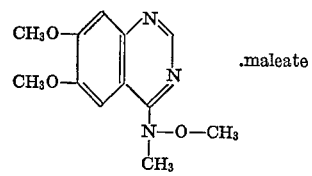

To 7.5 g. of 4-chloro-6,7-dimethoxyquinazoline in 400 ml. benzene is added 4.1 g. N,O-dimethylhydroxyl-amine and the mixture is stirred over night. Additional O,N-dimethylhydroxylamine is added (about 4 g.) and the mixture is heated under reflux for 24 hours. The benzene is decanted from the resulting oily material which contains most of the desired product and the oil extracted with water and evaporated to dryness. The oil is dissolved in water and methylene chloride, the aqueous phase is made basic by addition of 2 N sodium hydroxide and repeatedly extracted with methylene chloride. The combined organic phases are extracted with water, dried over sodium sulfate and evaporated in vacuo. The residue is dissolved in a little methylene chloride and is filtered through a short column of aluminum oxide. The solvent is evaporated and the residue in ethanol is treated with a solution of 2.4 g. of maleic acid. The resulting solid is filtered off and recrystallized from ethanol to obtain 4-(N,O-dimethylhydroxylamino) - 6,7 - dimethoxy-quinazoline maleate, M.P. 169–171° C.

EXAMPLE 2

4-(N,O-dimethylhydroxylamino)-6,7,8-trimethoxy-quinazoline

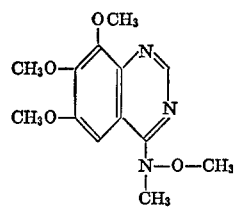

Step A: Preparation of 2-amino-3,4,5-trimethoxy methyl benzoate.—A mixture of 39 g. of 2-nitro-3,4,5-trimethoxy methyl benzoate, 100 ml. of acetic acid and 2.5 g. of 5% palladium on charcoal is shaken with hydrogen at temperature of 60° C. and a hydrogen pressure of 50 p.s.i. for 25 hours. The resulting mixture is filtered and concentrated in vacuo. The resulting residue is partitioned between methylene chloride and an excess of sodium carbonate solution. The methylene chloride solution is dried, concentrated in vacuo and the resulting oil distilled (105° C. $5 \times 10^{-3}$ mm.) to obtain an oil of 2-amino-3,4,5-trimethoxy methyl benzoate.

Step B: Preparation of 6,7,8 - trimethoxy-quinazolin-4(3H)-one.—A solution of 24.2 g. of 2-amino-3,4,5-trimethoxy methyl benzoate in 80 ml. of 99% formamide is refluxed for 1¼ hours. The reaction mixture is then cooled, 200 ml. of ice water is added, and the solid material is separated by filtering, washed with water and dried to obtain 6,7,8 - trimethoxy-quinazolin-4(3H)-one, M.P. 220–222° C.

Step C: Preparation of 4-chloro-6,7,8-trimethoxy-quinazoline.—A mixture of 11.6 g. of 6,7,8-trimethoxy-quinazolin-4(3H)-one and 40 ml. of phosphorous oxychloride is refluxed for 20 minutes. The reaction mixture is cooled, and added to an excess of dilute ammonia solution at 0° C. The resulting mixture is shaken at 0° C. with 350 ml. of chloroform and the organic phase is then dried and passed through silica gel. The solvent is removed in vacuo to obtain 4 - chloro-6,7,8-trimethoxy-quinazoline, M.P. 110° C.

Step D: Preparation of 4 - (N,O-dimethylhydroxylamino)-6,7,8 - trimethoxyquinazoline.—Following essentially the procedure of Example 1 the compound 4-chloro-6,7,8-trimethoxy-quinazoline is reacted with N,O-dimethylhydroxylamine in the presence of potassium carbonate to obtain on crystallization from diethyl ether/pentane the compound 4 - (N,O-dimethylhydroxylamino) - 6,7,8-trimethoxy-quinazoline, M.P. 50–52° C.

EXAMPLE 3

4(N,O-dimethylhydroxyamino)-6,7-dimethyl-quinazoline

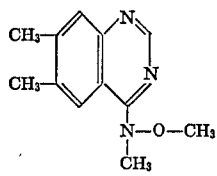

Step A: Preparation of 4,5 - dimethyl-2-nitrobenzonitrile.—A suspension of 5.1 g. of 4,5-dimethyl-2-nitroaniline in 7.6 ml. of conc. hydrochloric acid and 6 ml. of water cooled to 0° C. is treated dropwise with a solution of 2.24 g. of sodium nitrite in 4 ml. of water while maintaining 0° C.–3° C. The resulting mixture is stirred at minus 5° C. for ½ hour and is then added to a boiling mixture of 12.8 g. of cupric sulfate pentahydrate and 13.2 g. of potassium cyanide in 50 ml. of water. The mixture after nitrogen evolution is cooled and solids filtered off, washed with water and dried. The resulting solids are then dissolved in 75 ml. of chloroform and insoluble material removed by filtering. The solution is evaporated in vacuo to obtain a crystalline material which is crystallized from benzene/heptane to obtain 4,5-dimethyl-2-nitrobenzonitrile, M.P. 162–164° C.

Step B: Preparation of 4,5-dimethyl-2-aminobenzamide.—A mixture of 1.0 g. of 4,5-dimethyl-2-nitrobenzonitrile and 300 mg. of Raney nickel in 15 ml. of methanol is hydrogenated at pressure of 5–10 p.s.i. for ½ hour. The resulting mixture is filtered, evaporated in vacuo and the solid residue dissolved in 50 ml. of hot chloroform and treated with charcoal. The solution is then evaporated in vacuo and the solid residue crystallized from benzene to obtain 4,5-dimethyl-2-aminobenzamide, M.P. 175° C.

Step C: Preparation of 4,5-dimethyl-quinazolin-4(3H)-one.—A mixture of 15 g. of 4,5-dimethyl-2-aminobenzamide and 35 ml. of 99% formamide is refluxed for 35 minutes. The resulting mixture is cooled, diluted with water, filtered and the solid material dried to obtain 4,5-dimethyl-quinazolin-4(3H)-one, M.P. 245–247° C.

Step D: Preparation of 4-chloro-6,7-dimethyl-quinazoline.—A mixture of 14.0 g. of 4,5-dimethyl-quinazolin-4(3H)-one and 40 mls. of phosphorusoxychloride is refluxed for 15 minutes. The cooled resulting mixture is added to 1 liter of ice water and this mixture filtered, washed with cold water and dried in vacuo at 20° C. The resulting residue is dissolved in 300 ml. of chloroform, washed with cold dilute sodium bicarbonate solution, dried and filtered through 400 ml. of silica gel using chloro-6,7-dimethyl-quinazoline, M.P. 131.5–132° C.

Step E: Preparation of 4-(N,O-dimethylhydroxylamino)-6,7-dimethylquinazoline.—Following essentially the procedure of Example 1 and employing potassium carbonate as an acid binding agent there is obtained on crystallization from pentane the compound 4-(N,O-dimethylhydroxylamino) - 6,7 - dimethyl-quinazoline, M.P. 73–75° C.

EXAMPLE 4

4-(N,O-dimethylhydroxylamino)-7,8-dimethylquinazoline

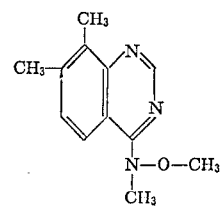

Step A: Preparation of 2-nitro-3,4-dimethyl methyl benzoate.—An amount of 47.2 g. of 3,4-dimethyl methyl benzoate is added over 20 minutes to a cooled well-stirred mixture of 66 ml. of 96% sulfuric acid and 151 ml. of 70% nitric acid. The reaction temperature is regulated at between 10–15° C. with stirring for 2 hours and the reaction mixture is then added slowly to 2 liters of ice water. The resulting precipitated solids are filtered off, dissolved in 500 ml. of methylene chloride and washed with an excess of sodium hydrogen carbonate solution. The organic phase is dried, evaporated to dryness, the crystalline residue is crystallized from methanol-water and recrystallized from methanol to obtain 2-nitro-3,4-dimethyl methyl benzoate, M.P. 110–111° C.

Step B: Preparation of 2-amino-3,4-dimethyl methyl benzoate.—A mixture of 36.7 g. of 2-nitro-3,4-dimethyl methyl benzoate, 60 ml. of acetic acid and 1.0 g. of platinum oxide is shaken with hydrogen at a hydrogen pressure of 10–20 p.s.i. for 1.5 hours. The resulting mixture is filtered and the filtrate treated by addition of ice water. The resulting solid is filtered to obtain 2-amino-3,4-dimethyl methyl benzoate, M.P. 71–73° C.

Step C: Preparation of 7,8-dimethyl quinazolin-4(3H)-one.—A solution of 26.2 g. of 2-amino-3,4-dimethyl methyl benzoate in 100 ml. of 99% formamide is refluxed for 4.5 hours. The reaction mixture is then cooled, the solid material separated by filtering and washed with water and dried to obtain 7,8-dimethyl-quinazolin-4(3H)-one, M.P. 254–257° C.

Step D: Preparation of 4-chloro-7,8-dimethyl-quinazoline.—A mixture of 20.4 g. of 7,8-dimethyl-quinazolin-4(3H)-one and 50 ml. of phosphorous oxychloride is refluxed for 50 minutes. The reaction mixture is cooled, dissolved in 700 ml. of chloroform and shaken at 0° C. with an excess of dilute ammonia solution. The organic phase is dried and passed through silica gel. The solvent is removed in vacuo to obtain 4-chloro-7,8-dimethyl-quinazoline, M.P. 91–92° C.

Step E. Preparation of 4-(N,O-dimethylhydroxylamino)-7,8-dimethyl-quinazoline.—Following essentially the procedure of Example 1 and employing potassium carbonate as acid binding agent there is obtained the compound 4-(N,O-dimethylhydroxylamino) - 7,8 - dimethyl-quinazoline.

EXAMPLE 5

4-(N,O-dimethylhydroxylamino)-6-methoxy-quinazoline

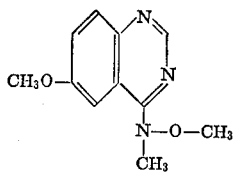

To a suspension of 4.0 g. of 4-chloro-6-methoxyquinazoline and 4 g. of potassium carbonate in 100 ml. benzene is added 1.3 g. N,O-dimethylhydroxyl-amine and this mixture is refluxed for 24 hours. The cooled reaction mixture is treated with water, the phases separated and the organic phase washed several times with water. The solvent is evaporated and the residue distributed between methylene chloride and 1 N hydrochloric acid. The aqueous phases is extracted once with methylene chloride and made basic with 2 N sodium hydroxide solution. The oil which is formed is extracted with methylene chloride, the solution extracted with water, dried and evaporated in vacuo. The residue is dissolved in a little methylene chloride and is filtered through a short column of aluminum oxide. The solvent is evaporated and the residue crystallized from diethyl ether/pentane to obtain 4-(N,O-dimethylhydroxylamino) - 6 - methoxy-quinazoline maleate, M.P. 53–55° C.

EXAMPLE 6

Following essentially the basic procedure of preceding examples, the following compounds of the invention are obtained.
(a) 4-(N,O-dimethylhydroxylamino)-quinazoline maleate, M.P. 137–138° C. (crystallized from ethanol).
(b) 4-(N,O-dimethylhydroxylamino)-6-methyl-quinazoline.
(c) 4-(N,O-dimethylhydroxylamino)-7-chloro-quinazoline maleate, M.P. 133–135° C.
(d) 4-(N-methyl-O-dimethylaminopropylhydroxylamino)-6,7-dimethoxy-quinazoline.
(e) 4-(N,O-dimethylhydroxylamino)-6,7-methylenedioxyquinazoline, M.P. 115–117° C.

What is claimed is:
1. A compound of the formula

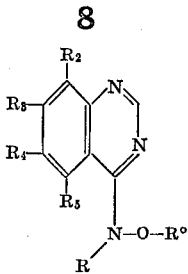

wherein

R° is alkyl of 1 to 6 carbon atoms or

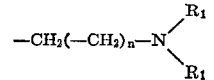

$n$ is 0 to 4,
each of $R_1$ is alkyl of 1 to 3 carbon atoms,
R is alkyl of 1 to 4 carbon atoms,
each of $R_2$, $R_3$, $R_4$ and $R_5$ is hydrogen, halo selected from the group consisting of fluoro and chloroalkyl of 1 to 3 carbon atoms or alkoxy of 1 to 3 carbon atoms; provided that $R_5$ is other than hydrogen only when all of $R_2$, $R_3$ and $R_4$ are hydrogen, that no more than one of $R_2$, $R_3$ and $R_4$ is halo, that no more than two of $R_2$, $R_3$ and $R_4$ are alkyl, and that any of $R_2$, $R_3$ and $R_4$ which are other than hydrogen are the same, or
$R_3$ and $R_4$ together form methylenedioxy with $R_2$ and $R_5$ being hydrogen, or a pharmaceutically accepted acid addition salt thereof.
2. A compound of claim 1 in which R° is alkyl.
3. A compound of claim 2 in which $R_2$ and $R_3$ are hydrogen and $R_3$ and $R_4$ are alkoxy.
4. The compound of claim 3 in which $R_3$ and $R_4$ are methoxy and R and R° are methyl.
5. A compound of claim 2 in which $R_5$ is hydrogen and $R_2$, $R_3$ and $R_4$ are alkoxy.
6. A compound of claim 2 in which $R_3$ and $R_4$ together form methylenedioxy.
7. A compound of claim 2 in which two of $R_2$, $R_3$ and $R_4$ are alkyl.
8. A compound of claim 1 in which R° is

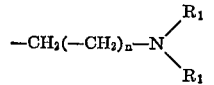

wherein $R_1$ and $n$ are as defined in claim 1.
9. A compound of claim 8 in which $R_3$ and $R_4$ are alkoxy.
10. A compound of claim 1 having the formula

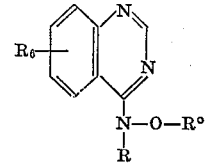

wherein $R_6$ is hydrogen, fluoro, chloro alkyl of 1 to 3 carbon atoms or alkoxy of 1 to 3 carbon atoms, and R and R° are as defined in claim 1.
11. A compound of claim 10 in which R° is alkyl.
12. The compound of claim 11 in which $R_6$ is hydrogen and R and R° are methyl.

References Cited
UNITED STATES PATENTS
2,461,950   2/1949   Wolf _____ 260—256.4 Q RICHARD J. GALLAGHER, Primary Examiner U.S. Cl. X.R.

260—251 A, 251 Q, 256.5 R, 583 DD; 424—251